United States Patent
Davoust

(10) Patent No.: US 9,592,915 B2
(45) Date of Patent: Mar. 14, 2017

(54) SYSTEM FOR SECURING AN AIRCRAFT SEAT AND AIRCRAFT SEAT COMPRISING SUCH A SYSTEM

(71) Applicant: ATTAX, Carrieres sur Seine (FR)

(72) Inventor: Stéphane Davoust, Paris (FR)

(73) Assignee: ATTAX, Carrieres sur Seine (FR)

( * ) Notice: Subject to any disclaimer, the term of this patent is extended or adjusted under 35 U.S.C. 154(b) by 0 days.

(21) Appl. No.: 14/762,753

(22) PCT Filed: Jan. 22, 2014

(86) PCT No.: PCT/EP2014/051264
§ 371 (c)(1),
(2) Date: Sep. 3, 2015

(87) PCT Pub. No.: WO2014/114680
PCT Pub. Date: Jul. 31, 2014

(65) Prior Publication Data
US 2015/0360785 A1    Dec. 17, 2015

(30) Foreign Application Priority Data
Jan. 22, 2013 (FR) ...................... 13 50552

(51) Int. Cl.
*B64D 11/06* (2006.01)
*F16B 2/18* (2006.01)

(52) U.S. Cl.
CPC .......... *B64D 11/0696* (2013.01); *F16B 2/185* (2013.01)

(58) Field of Classification Search
USPC ................... 248/500, 503, 503.1; 244/118.6; 410/101, 104, 105
See application file for complete search history.

(56) References Cited

U.S. PATENT DOCUMENTS

| | | | | |
|---|---|---|---|---|
| 4,047,689 A | * | 9/1977 | Grendahl | B60P 7/0815 410/105 |
| 4,277,043 A | * | 7/1981 | Weik | B64D 11/0696 248/503.1 |
| 4,376,522 A | * | 3/1983 | Banks | B64D 11/0696 244/118.6 |
| 8,292,224 B1 | | 10/2012 | Ahad et al. | |
| 2006/0104740 A1 | | 5/2006 | Girardin | |
| 2007/0065248 A1 | * | 3/2007 | Legeay | B60N 2/01575 410/105 |

(Continued)

FOREIGN PATENT DOCUMENTS

| | | |
|---|---|---|
| EP | 0053923 A1 | 6/1982 |
| EP | 1762490 A1 | 3/2007 |

OTHER PUBLICATIONS

International Search Report for Application No. PCT/EP2014/051264 in 4 pages.

*Primary Examiner* — Steven Marsh
(74) *Attorney, Agent, or Firm* — Knobbe, Martens, Olson & Bear LLP

(57) ABSTRACT

A device for securing an aircraft seat includes a base linked to the seat. The base includes a mechanism for fastening the base to a rail of an aircraft. The mechanism can be moved between locked and unlocked positions by an operating lever. The operating lever includes a visual indicator for indication of the locked and unlocked positions of the mechanism.

6 Claims, 2 Drawing Sheets

(56) References Cited

U.S. PATENT DOCUMENTS

| | | | | |
|---|---|---|---|---|
| 2010/0090060 A1* | 4/2010 | Marechal | ........... | B64D 11/0696 244/118.6 |
| 2011/0253874 A1* | 10/2011 | Marechal | ........... | B64D 11/0696 248/503.1 |
| 2011/0278398 A1* | 11/2011 | Marechal | ........... | B60N 2/01516 244/131 |
| 2015/0360785 A1* | 12/2015 | Davoust | ................. | F16B 2/185 248/542 |

* cited by examiner

SYSTEM FOR SECURING AN AIRCRAFT SEAT AND AIRCRAFT SEAT COMPRISING SUCH A SYSTEM

CROSS-REFERENCE TO RELATED APPLICATIONS

This application is a national stage application under 35 U.S.C. §371 of International Application No. PCT/EP2014/051264, filed on Jan. 22, 2014, and which claims priority benefit of French Patent Application No. FR 1350552, filed Jan. 22, 2013, the entire contents of all of which are hereby incorporated by reference herein.

The present invention relates to a system for securing an aircraft seat and a seat including at least one such system.

In the state of the art, many securing systems of this type are already known that generally include a base connected to the seat and make it possible to ensure securing thereof.

This base then includes fastening means, for example in a fastening rail of the aircraft.

These means are for example movable between an assembly/disassembly position and a fastening position for fastening the securing system in the rail, by means of an operating lever articulated on the base and able to be maneuvered by an assembly/disassembly operator.

Thus for example, the operating lever is articulated at one end on the base and is movable by the operator, between a retracted assembly/disassembly position and an active position for fastening the system, and therefore the seat, on the rail and therefore the rest of the aircraft.

In this active fastening position, means for example in the form of a hook of the corresponding end of the lever, i.e., the end thereof opposite that articulated on the base, cooperate with complementary means for retaining the lever in the locked position on the base, to lock the seat in position.

These retaining means are then for example supported by the base and are associated with unlocking means, allowing the operator to unlock the system and therefore the seat.

Thus for example, these retaining means can be unlocked by the operator, for example using an appropriate tool.

Different embodiments and forms of these means have been proposed.

However, all of these systems have the same drawback, which is that of not being able to ensure and guarantee, in particular for the operator, that the system is in one or the other of its stable positions, namely in the assembly/disassembly position or the fastening position.

Indeed, nothing in the systems of the state of the art indicates to the assembly/assembly operator that the securing system is positively in a given position.

This result in uncertainty for the operator, which imposes additional verifications on the latter to verify the state of the system.

The aim of the invention is therefore to resolve these problems.

To that end, the invention relates to a system for securing an aircraft seat to the rest of the aircraft, comprising a base linked to the seat and comprising means for fastening to a rail of the aircraft, which can be moved by an operating lever between locked and unlocked positions, characterized in that the operating lever comprises means forming a visual indicator of the locked/unlocked position of the means for fastening the base with respect to the rest of the aircraft.

According to other features of the device according to the invention, considered alone or in combination:

- the visual indicator-forming means are mounted movably while facing to an aperture formed in the upper face of the lever;
- the visual indicator-forming means are mounted in a recess of the end of the lever, that recess being closed off by a cover provided with the aperture;
- the visual indicator-forming means include two zones of different colors movable while facing to the aperture depending on the position of the system;
- the visual indicator-forming means are movable by cam means associated with the lever;
- the visual indicator-forming means include a slide movable to indicate the position of the fastening means;
- the visual indicator-forming means are provided on the upper face of the lever.

According to another aspect, the invention also relates to an aircraft seat, characterized in that it includes at least one securing system as previously described.

The invention will be better understood using the following description, provided solely as an example and done in reference to the appended drawings, in which.

Figure 1:
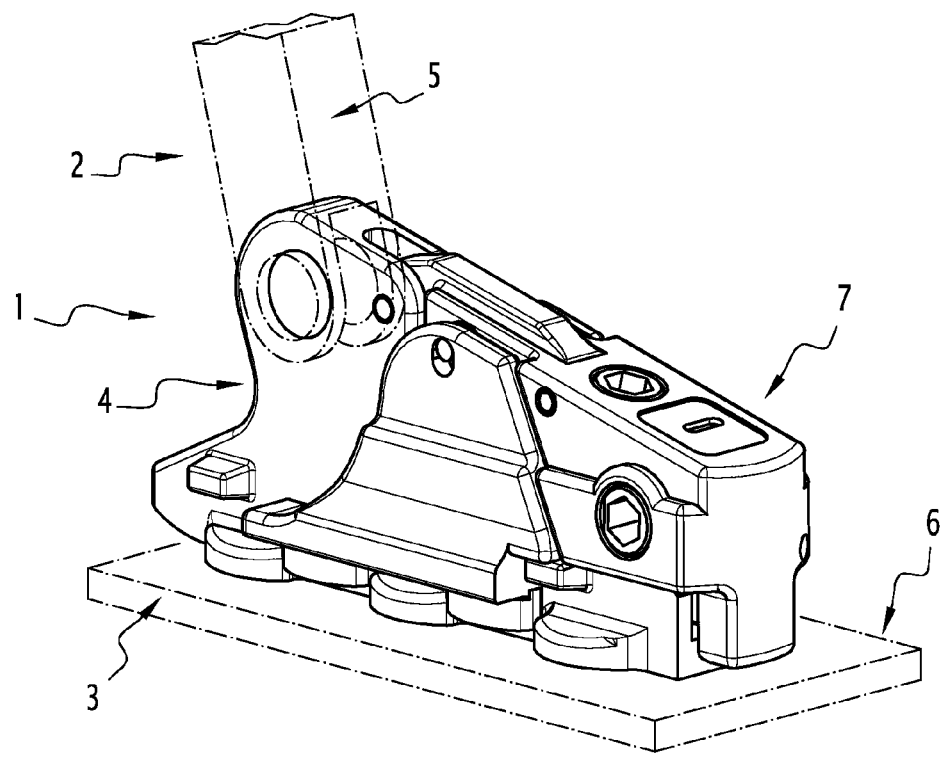
FIG. 1 shows a diagrammatic side view of a system for securing an aircraft seat.

These figures, and in particular FIG. 1, show a system for securing an aircraft seat.

The system is designated by general reference 1 in this figure, while part of the seat is designated by general reference 2 and the rest of the aircraft is designated by general reference 3.

Traditionally, the securing system includes a base designated by general reference 4, for example resting on the floor of the aircraft and on which the seat is for example fastened, and in particular a fastening foot 5 thereof.

Traditionally as well, the base 4 includes fastening means, for example in a rail, for example 6, of the floor of the aircraft 3.

These means for fastening the base, and therefore the seat on the rest of the aircraft, are then movable traditionally by an operating lever designated by general reference 7 in this FIG. 1, for example movable by an assembly operator, between locking and unlocking positions, for example making it possible to lock the securing system and therefore the seat in position, or on the contrary to assemble or disassemble it.

Different embodiments of this operating lever have already been proposed in the state of the art.

Figure 2:
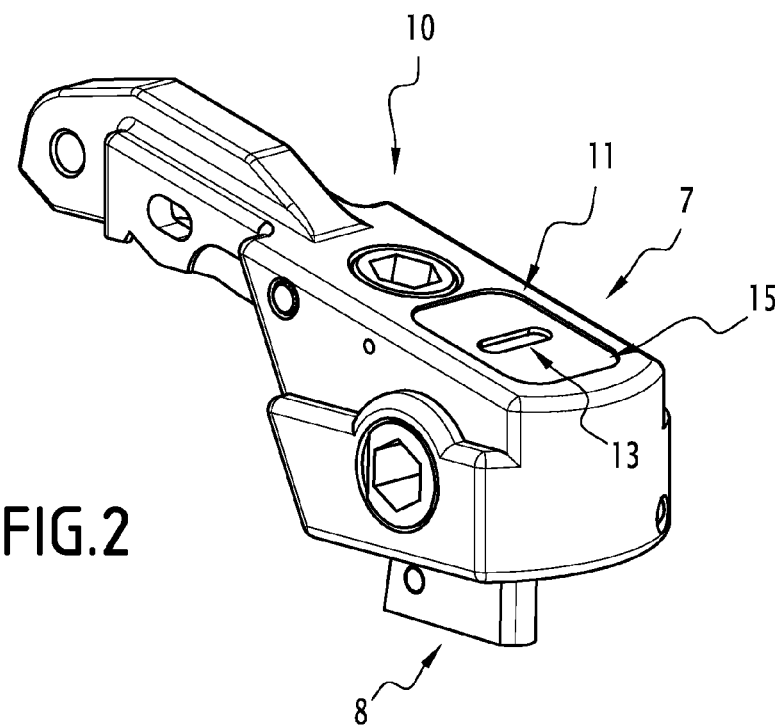
FIG. 2 shows a perspective view of an operating lever in the composition of such a system.
Figure 3:
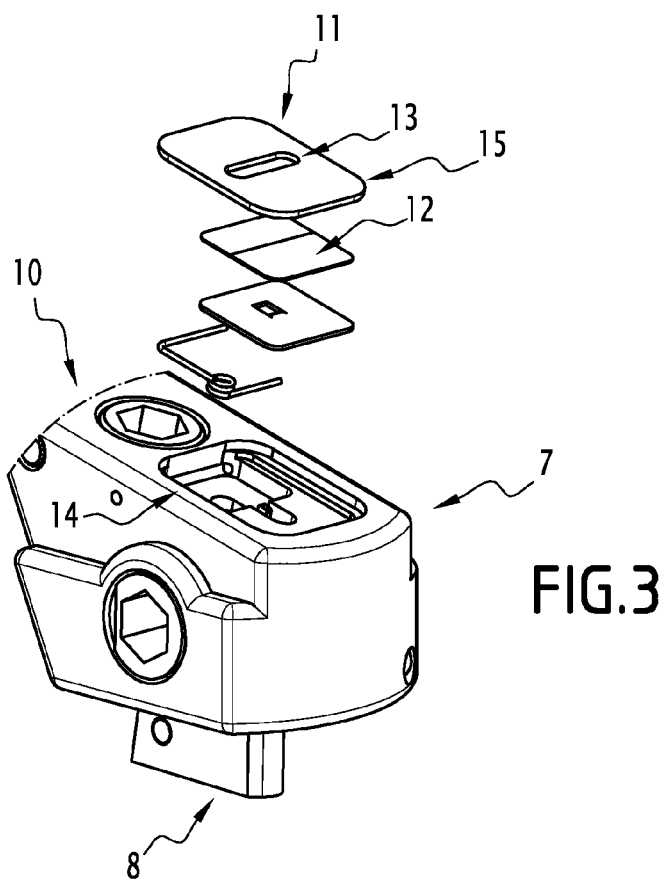
FIG. 3 shows a detailed view of the end of that lever with a removed part.
Figure 4:
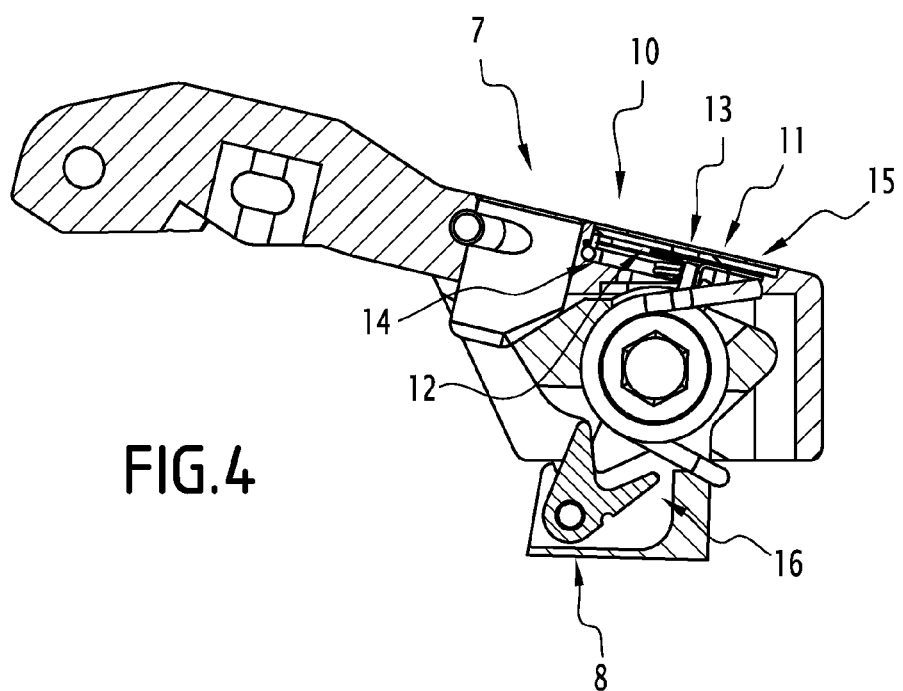
FIG. 4 shows a sectional view of such a lever.

As for example illustrated in FIGS. 2, 3 and 4, in the lever 7 in the composition of a securing system according to the invention, one end of that lever is articulated on the base 4, while the opposite end of the lever 7 is for example provided with a locking latch in the form of a hook, designated by general reference 8.

This locking latch 8 is then suitable for cooperating with complementary retaining means for the rest of the base, to ensure locking in position of the lever and therefore of the securing system and the seat, for example in position in the rail 6 and therefore relative to the rest of the aircraft.

One can then see that this lever 7 is mounted in an articulated manner in the rest of the base 4 and can be maneuvered by the operator, to cause a movement of the fastening means of the base 4 on the rail 6 of the aircraft between the locking and unlocking positions, allowing the locking or the assembly and disassembly thereof.

Furthermore, the lever 7 is associated with means allowing the operator to lock it in position or unlock it.

Different embodiments of these various means have already been described in the state of the art.

Because these are not the subject-matter of the present invention, they will not be described in more detail below.

It will simply be noted that in the securing system according to the invention, the operating lever 7 includes, on its upper face for example designated by general reference 10 in these FIGS. 2 to 4, visual indicator-forming means for indicating the locking/unlocking position of the base relative to the seat.

These visual indicator-forming means are designated by general reference 11 in these figures and are then visible by the operator on the upper face of this lever, for example.

In fact and as illustrated in these figures, these indicator-forming means for example assume the form of a slide in the form of a plate or another form, designated by general reference 12, and mounted movably while facing to an aperture, for example 13, arranged on the upper face of the lever 7.

This slide 12 then for example has two zones of different colors, for example such as one that is green and the other that is red, making it possible based on the color zone facing to the aperture to show the assembly operator whether the securing system is in the positive locking position, as is for example the case when the green zone of the slide is facing to the aperture, or in the unlocking position, when for example the red zone thereof is facing to the aperture.

Of course, this position of the slide is controlled by the fastening means, depending on their position.

In the described example, this slide 12 is then placed in a recess, for example 14, provided at the end of the lever 7, the recess 14 being closed off by a cover designated by general reference 15, that cover including the aperture 13 for observing the slide.

Of course, other embodiments of these means can be considered.

As illustrated in FIG. 4, the slide 12 can be moved while facing to the aperture 13, for example under the action of cam means designated by general reference 16 in this FIG. 4.

These cam means are for example associated with the locking latch 8 of the lever, to detect when the latter is in the positive locking position, or on the contrary in the unlocking position, so as to place the slide 12 in one or the other of its positions and thus to show the operator the locking or unlocking state of the system.

One can then see that this simple visual indicator makes it possible to indicate the position of the fastening system to the assembly operator, safely and simply.

Of course, many other embodiments of these means can be considered.

The invention claimed is:

1. A system for securing an aircraft seat to the rest of the aircraft, comprising:
   a base linked to the seat, and
   a mechanism for fastening the base to a rail of the aircraft, the mechanism is movable by an operating lever between locked and unlocked positions,
   wherein the operating lever comprises a visual indicator for indicating the locked and unlocked positions of the mechanism for fastening the base, and
   the visual indicator is mounted movably in a recess of the end of the operating lever while facing to an aperture formed in an upper face of the operating lever, the recess being closed off by a cover provided with the aperture.

2. The securing system according to claim 1, wherein the visual indicator includes two zones of different colors movable while facing to the aperture depending on the position of the system.

3. The securing system according to claim 1, wherein the visual indicator is movable by a cam associated with the lever.

4. The securing system according to claim 1, wherein the visual indicator includes a slide movable to indicate the position of the fastening means.

5. The securing system according to claim 1, wherein the visual indicator is provided on the upper face of the lever.

6. An aircraft seat including the securing system according to claim 1.

* * * * *